March 7, 1944.  E. R. PRICE  2,343,265
ENGINE CONTROL MECHANISM
Filed Dec. 6, 1939  6 Sheets-Sheet 1
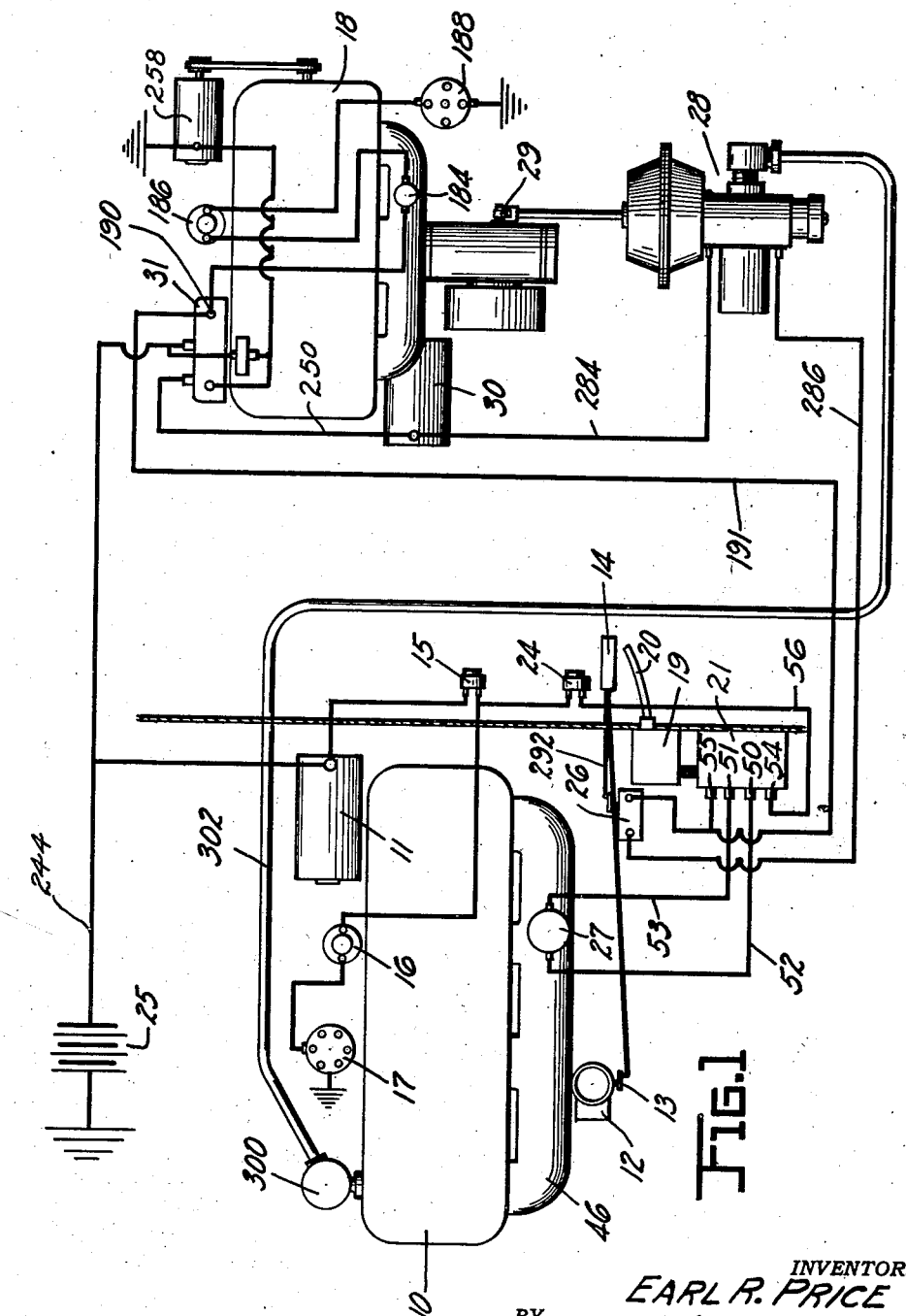
INVENTOR.
EARL R. PRICE
BY
F. O. Clayton
ATTORNEY.

March 7, 1944.   E. R. PRICE   2,343,265
ENGINE CONTROL MECHANISM
Filed Dec. 6, 1939   6 Sheets-Sheet 2
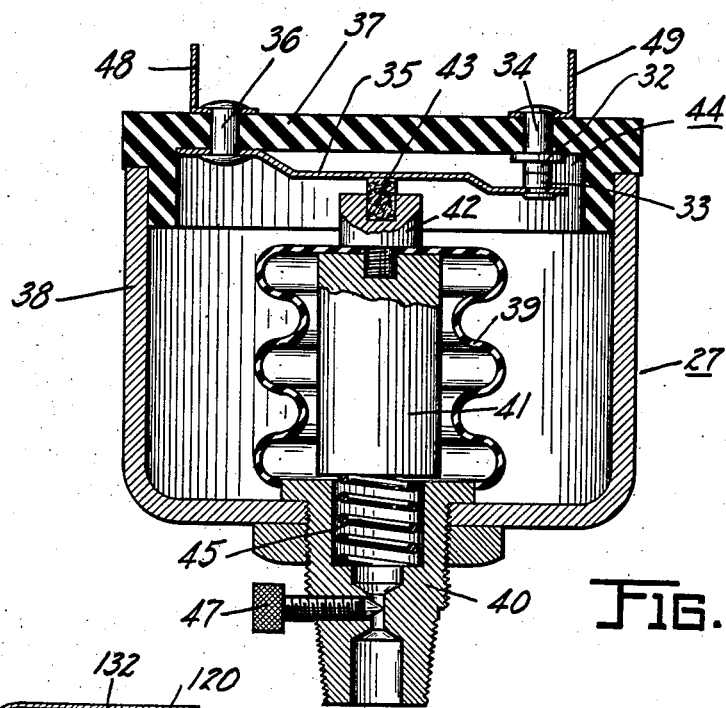
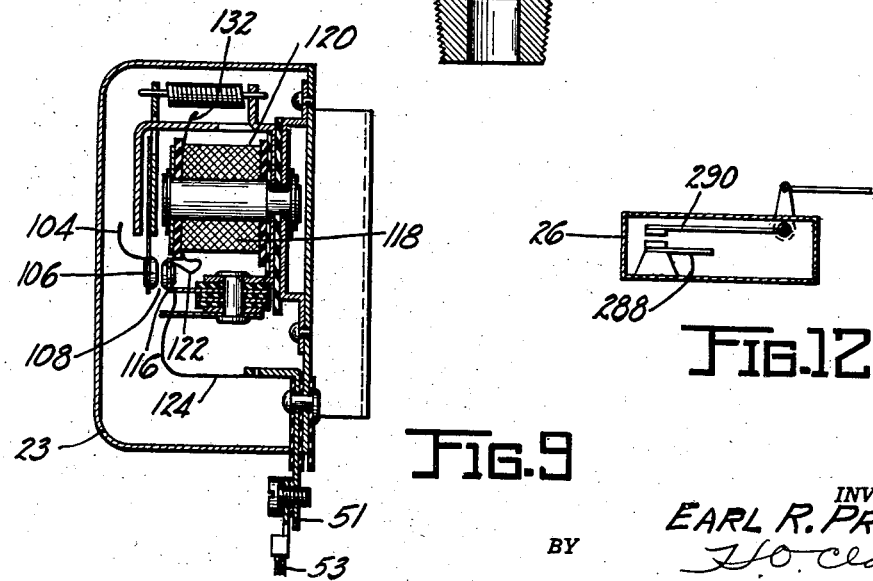
INVENTOR.
EARL R. PRICE
BY
ATTORNEY.

INVENTOR.
EARL R. PRICE
BY
ATTORNEY.

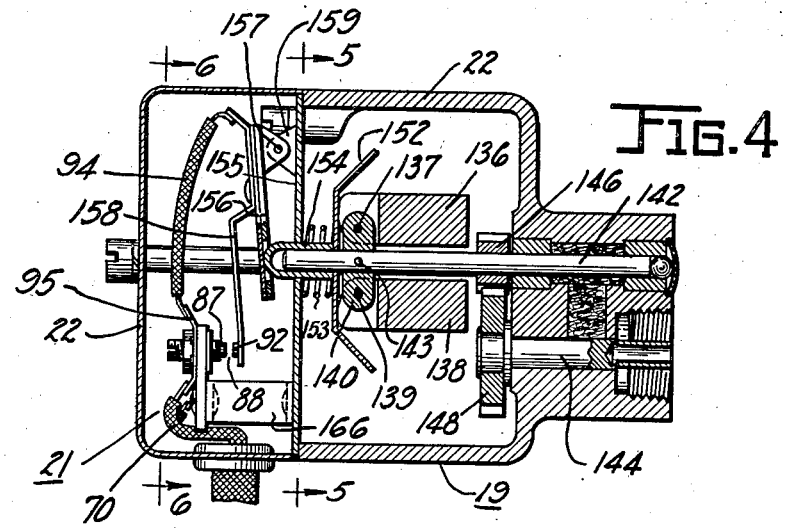
Fig.4
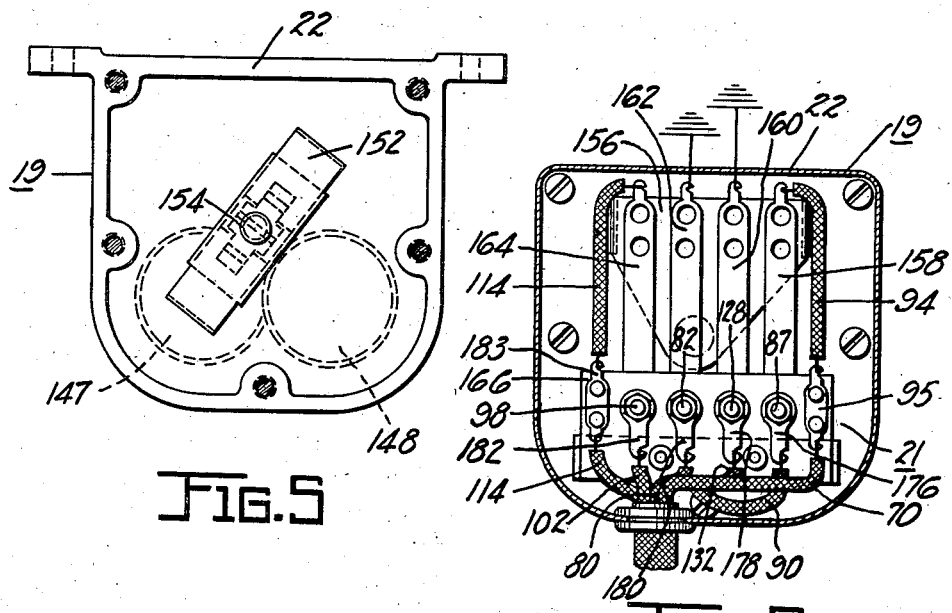
Fig.5
Fig.6

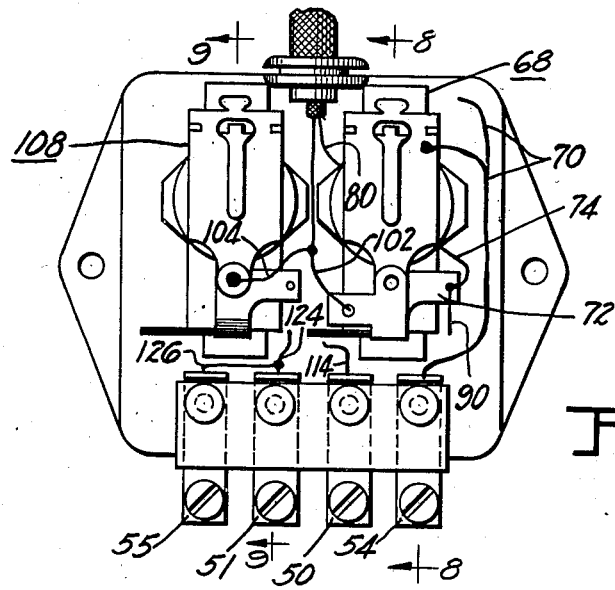
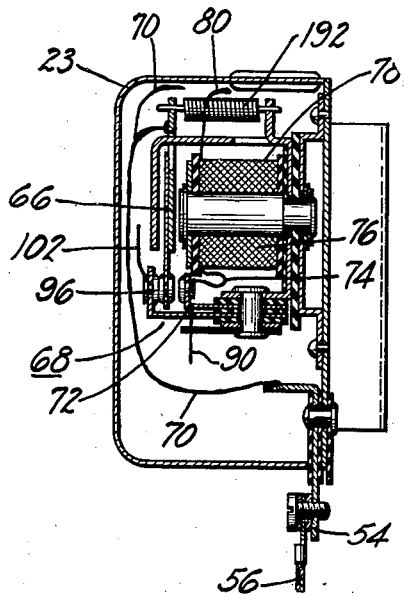

March 7, 1944.       E. R. PRICE       2,343,265
ENGINE CONTROL MECHANISM
Filed Dec. 6, 1939       6 Sheets-Sheet 6

INVENTOR.
EARL R. PRICE
BY
ATTORNEY.

Patented Mar. 7, 1944

2,343,265

UNITED STATES PATENT OFFICE 2,343,265

ENGINE CONTROL MECHANISM

Earl R. Price, South Bend, Ind., assignor to Bendix Aviation Corporation, South Bend, Ind., a corporation of Delaware Application December 6, 1939, Serial No. 307,745

13 Claims. (Cl. 180—54)

This invention relates in general to the power plant of an automotive vehicle and in particular to means for controlling the operation of an auxiliary or so-called booster engine supplementing the master engine of heavy-duty vehicles, including trucks, busses, etc.

The principal object of my invention is to provide automatically operable means for insuring the desired speed of a heavy-duty automotive vehicle, for example, when the same is getting under way after a stop in traffic or when the vehicle is unnecessarily slowed down in climbing a hill. As is well known by all drivers of automotive vehicles, a slow moving truck or bus constitutes a traffic hazard, particularly when the vehicle is proceeding uphill, and my invention is designed to remove this hazard.

Another object of my invention is to provide a control which serves to automatically start and stop the operation of the booster engine in accordance with the speed of the vehicle and the operation of the throttle of the master engine.

With my invention the demands upon the operator of the vehicle are not increased, the booster engine being automatically cut into operation after the throttle is opened wide and the speed of the vehicle reaches a predetermined factor, say, 10 M. P. H. The engine is then automatically cut out of operation at or above a certain speed of the vehicle, say, 35 M. P. H. Thereafter, should the speed of the vehicle be decreased, despite the wide-open or substantially open throttle, the booster engine is again cut into operation at a predetermined speed, say 25 M. P. H., and when the speed is decreased to a relatively low factor, say, 9 M. P. H., said engine is again cut out of operation.

Yet another object of the invention is to provide control mechanism for a booster engine operative to cut the engine out of operation when the speed of the vehicle reaches a predetermined factor and then to restart said engine when, but only when, the speed of the vehicle is reduced to a predetermined factor below the speed at which said engine was cut out of operation.

Yet another object of my invention is to provide, in an automotive vehicle equipped with a power plant having a master engine and a booster engine, means for controlling the operation of said engines including a mechanism for automatically starting the booster engine should it come to an undesired stop when its ignition switch is closed, and further including power means for operating the throttle of the booster engine, the accelerator of the vehicle, a vacuum operated switch and a cut-in and cut-out switch mechanism actuated by power means including a vehicle operated governor, all of said mechanisms being interlocked and cooperating to effect the desired control.

Yet another object of the invention is to provide power means for first starting a booster engine and then operating its throttle, said means being controlled by controls associated with the master engine of the vehicle, including an accelerator operated switch and a governor controlled cut-in and cut-out switch mechanism.

Yet another object of my invention is to provide a control means for a master engine and a booster engine an on automotive vehicle, said control means including means for delaying the starting of the booster engine after the vehicle has reached a predetermined speed, thus preventing an undesired operation of the controls to effect a cranking of the booster engine should the driver suddenly reduce the speed of the vehicle below the aforementioned predetermined speed after having reached said speed.

Another object of the invention is to provide means for controlling the starting of a booster engine including a mechanism for automatically recranking the engine in the event it comes to an undesired stop, and further including power means for operating the throttle of said engine, said power means being so interlocked with the aforementioned mechanism for recranking the engine as to insure an opening of the throttle only after the engine has been started.

A further object of the invention is to provide a control mechanism for a booster engine on an automotive vehicle, said mechanism automatically functioning to start the engine when the speed of the vehicle reaches a predetermined factor and the throttle of the master engine of the vehicle is opened a predetermined amount and automatically functioning to thereafter cut off the ignition of the master engine to stop the same when the vehicle speed reaches a predetermined factor.

Yet another object of the invention is to provide a control mechanism for the booster engine of an automotive vehicle, said mechanism functioning to idle the booster engine upon release of the accelerator a predetermined amount when the vehicle is traveling at a sufficient speed to operate the control mechanism to provide electric current for the ignition system of the booster engine.

Other objects of the invention and desirable details of construction and combinations of parts will become apparent from the following description of a preferred embodiment, which description is taken in conjunction with the accompanying drawings, in which:

Figure 1 is a diagrammatic view disclosing the booster engine control mechanism constituting my invention;

Figure 2 is a sectional view disclosing, in detail, the manifold vacuum operated switch mechanism of my invention;

Figure 4 is a sectional view of a part of the breaker switch mechanism disclosed diagrammatically in Figure 3, together with the governor for operating said mechanism;

Figure 5 is a sectional view, taken on the line 5—5 of Figure 4, disclosing certain details of the governor mechanism;

Figure 6 is a sectional view, taken on the line 6—6 of Figure 4, disclosing details of the breaker switch mechanism;

Figure 7 is a plan view of the hold-down relay switch mechanism with the cover removed;

Figure 8 is a sectional view of the hold-down relay switch mechanism, said view being taken on the line 8—8 of Figure 7;

Figure 9 is another sectional view of the hold-down relay switch mechanism, said view being taken on the line 9—9 of Figure 7;

Figure 12 is a sectional view of the accelerator actuated switch for in part controlling the operation of the throttle operating power mechanism disclosed in Figure 10.

Figure 11:
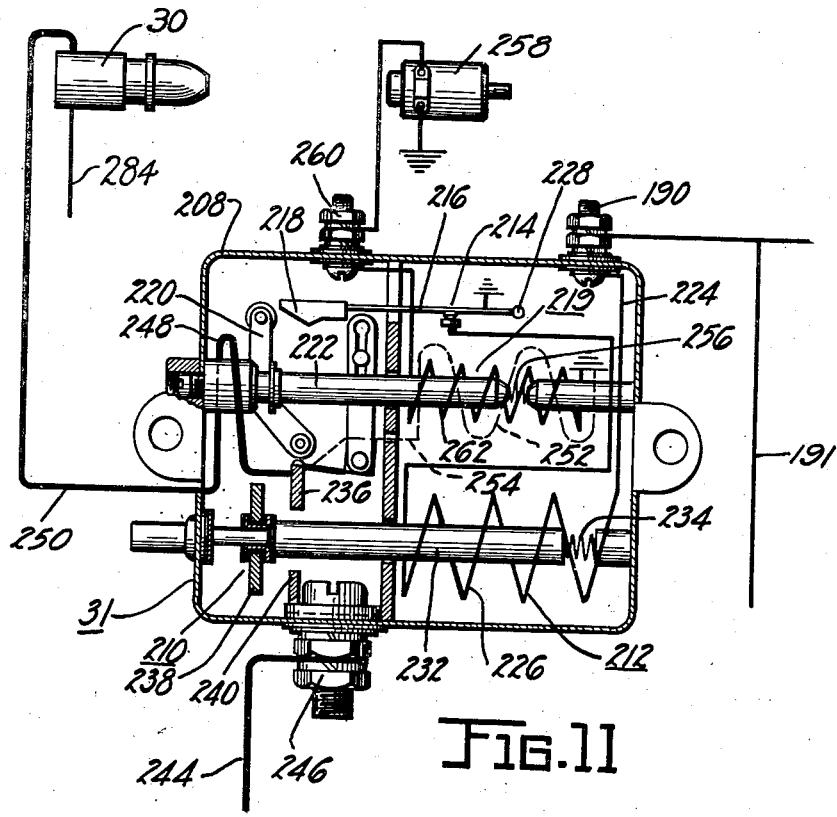
Figure 11 is a sectional view of the unit for controlling the starting motor of the booster engine.

Referring now to Figure 1 disclosing a preferred embodiment of my invention, the master engine 10 of a heavy-duty vehicle such as a truck or bus is controlled by the conventional controls, including a starting motor 11, a carburetor 12, a throttle 13, an accelerator 14 and an ignition system including an ignition switch 15, an ignition coil 16 and a distributor 17. My invention has to do only with means for controlling the operation of a booster engine 18, which may be incorporated in the power plant of the vehicle between the master engine and the change-speed transmission. The booster engine and its connections with the remainder of the power plant of the vehicle constitute no part of my invention.

Describing briefly the principal elements of this booster engine control mechanism, a governor 19, driven by a cable 20, serves to operate a breaker switch mechanism indicated in general by the reference numeral 21, said mechanism and governor being housed within a two-part casing 22. The cable 20 may be drivably connected either to the change-speed transmission or to the propeller shaft, whereby there is provided means for operating the governor 19 in accordance with the speed of the vehicle. The governor operated breaker switch mechanism 21 is electrically interlocked with a hold-down relay switch mechanism housed within a casing 23, said mechanism being disclosed in Figures 7, 8 and 9. As will be described in detail hereinafter, the power operated switch mechanisms are wired to a booster engine ignition switch 24, the master engine ignition switch 15, a battery 25, an accelerator operated switch 26, an intake manifold vacuum operated breaker switch mechanism 27, a power operated and power controlled mechanism 28 for operating the throttle 29 of the booster engine and a mechanism, including a starting motor 30 and an electrically operated and controlled starter control unit 31. The unit 31 serves to supply current to the starting motor 30 to effect a cranking of the booster engine and a recranking of said engine should it come to an undesired stop.

Describing the booster engine control mechanism and referring to Figure 2, there are disclosed in detail the manifold vacuum operated breaker switch and the vacuum operated motor for operating said switch. This switch includes contacts 32 and 33, which are secured to a pin 34 and to a yieldable metallic clip 35 respectively. This clip is secured by pin 36 to the top portion 37 of a housing 38 for the switch mechanism and its operating means. The portion 37 is of insulating material such as rubber. A Sylphon or bellows member 39 within the housing 38 is secured to one end of a union 40 adjustably mounted in the base of the housing, and thrust blocks 41 and 42 are secured to the top of said member. A small block 43 of insulating material is mounted in the top of the block 42 and is positioned to contact the clip 35 when the switch is closed. The switch is indicated by the reference numeral 44. A spring 45, housed within a recess in the union 40, serves to force the blocks 41, 42 and 43 upwardly to close said switch. The outer surface of the union is threaded at its lower end to provide means for securing the union to the intake manifold 46 of the master engine, and the union is bored to provide a passageway to interconnect the interior of the bellows with said manifold. A needle valve member 47 is adjustably mounted in the union, the tapered end of said valve member projecting into a relatively small diametered portion of the aforementioned passageway and serving to determine the rate of flow of air through said passageway. Clips 48 and 49 are wired to terminals 50 and 51 respectively by leads 52 and 53. The terminals 50 and 51 are secured to the casing 23, which houses the holddown relay switch to be described hereinafter.

Describing the operation of this vacuum operated switch mechanism 27, as is well known in this art, when the accelerator 14 is released to close the throttle 13 and idle the master engine, the intake manifold 46 is partially evacuated. Accordingly, there results a partial evacuation of the bellows 39, which is placed in fluid transmitting connection with the manifold by the passageway in the union 40. The bellows, which may be defined as a pressure differential operated motor, then collapses due to the differential of pressures to which the top of the bellows is subjected, for the outer surface of the motor is at the time subjected to atmospheric pressure within the housing 38. The collapsing of the bellows results in a further compression of the spring 45 and the movement of contact 33 away from the contact 32. The switch 44 is thus opened when the accelerator 14 is released to idle the master engine.

When the accelerator is depressed and the throttle of the carburetor opened, there results a flow of combustible mixture into the intake manifold, which increases the gaseous pressure therein. This pressure, even when the throttle is wide open, never quite equals atmospheric pressure: however, the parts of the mechanism are so constructed and arranged that with a wide-open throttle or at least a substantially open throttle the gaseous pressure within the bellows 39 is such as to permit the spring 45 to expand and move the contact 33 into engagement with the contact 32, thereby closing the switch. Preferably the mechanism is so constructed as to close the switch 44 when the degree of vacuum within the intake manifold is measured, in the barometer used for such purposes, by three inches of mercury or less.

There is thus provided power means for operating the switch 44, the closing of said switch being effected when the accelerator is sufficiently opened and the opening of said switch being effected when the accelerator is closed. The needle valve 47 serves to delay the influx and efflux of air into and from the bellows 39, thereby preventing an unnecessary operation of the bellows, for, as will be pointed out hereinafter, once the throttle is opened to close the switch 44 and the vehicle is traveling between certain limits of speed the booster engine will be operating. Accordingly, between these speed limits it is unnecessary to operate the accelerator to control the operation of the unit 31 for either starting or stopping the booster engine. Unnecessary wear of the bellows 39 would result if the same were quickly operated with each opening and closing of the accelerator, and when driving most vehicle operators often depress and completely release the accelerator.

Describing now the breaker and relay switches and other control mechanisms disclosed in Figures 3 to 9 inclusive, the aforementioned terminals 50 and 51 and terminals 54 and 55 are fixedly secured to the casing 23 by rivets or other suitable fasteners. The terminal 54, which may be defined as an inlet terminal, is connected to the booster engine ignition switch 24 by a lead 56, said switch being wired in series with the master engine ignition switch 15, starting motor 11 and battery 25, as disclosed in Figure 1. A movable contact 66 of a so-called hold-down relay switch 68 is connected to the terminal 54 by a lead wire 70, and a fixed contact 72 of said switch is connected by a lead wire 74 to the winding 76 of a solenoid 78. The winding 76 is also connected by a lead 80, to a fixed contact 82 of a governor operated switch 84, and a movable contact 86 of said switch is grounded as diagrammatically disclosed in Figures 3 and 6. The fixed contact 72 is also connected to a fixed contact 87 of another governor operated switch 88 by a lead 90, and a movable contact 92 of said switch is connected to the lead 70 by a lead 94 through a terminal clip 95. A fixed contact 96 of the switch 68 is connected to a fixed contact 98 of a governor operated switch 100 by a lead 102, and a lead 104 interconnects a movable contact 106 of a hold-down relay switch 108 with the lead 102. The switch 108 may also be defined as a single-pole single-throw switch, and switch 68 may be defined as a single-pole double-throw switch. A movable contact 110 of the switch 100 is connected to the terminal 50 by a lead 114.

A fixed contact 116 of the relay switch 108 is connected to a winding 118 of a solenoid 120 by a lead 122 and is connected to the terminal 51 by a lead 124. A lead 126 interconnects the lead 124 with the terminal 55, which may be defined as an outlet terminal. The winding 118 is connected to a fixed contact 128 of a governor operated switch 130 by a lead 132, and a movable contact 134 of said switch is grounded as disclosed in Figures 3 and 6.

Figure 3:
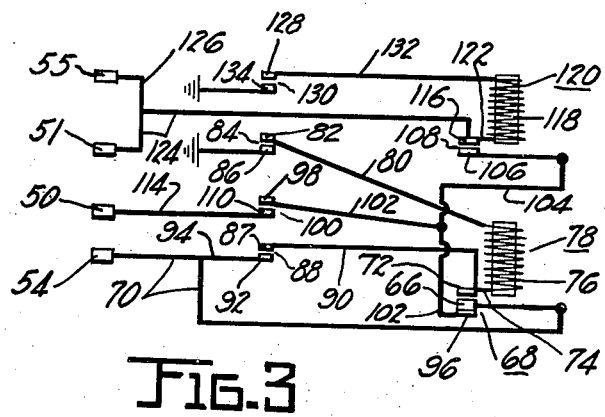
Figure 3 is a diagrammatic view disclosing the wiring of the governor operated breaker switch mechanism and of the hold-down relay switch mechanism cooperating therewith.

As disclosed in Figure 4, the governor 19 includes two weights 136 and 138 pivotally secured, by pins 137 and 139 respectively, to a supporting member 140, which is secured to a shaft 142 by a pin 143. The shaft 142 is driven by a shaft 144, the drive being effected by meshed gears 146 and 148 secured to said shafts 142 and 144 respectively. The shaft 144 is connected to the cable 20, which is connected to the transmission. A gear 147 may also be meshed with the gear 148, gear 147 serving to actuate a speedometer operating mechanism. Upon rotating the shaft 144 the weights 136 and 138 move outwardly about the pins 137 and 139, thereby forcing to the left a thrust plate 152 slidably mounted upon the shaft 142. The degree of movement of said plate is of course directly proportional to the speed of the vehicle. A hollow pin 154, sleeved over the shaft 142, is interposed between a triangular-shaped flexible plate 156 and the plate 152. Plate 156 is pivotally mounted at 157 upon a tab 159 secured to an inner wall of the switch casing. The movable contacts 92, 110, 86 and 134, disclosed in Figure 3, are mounted on the ends of relatively narrow flexible strips 158, 160, 162 and 164 respectively, which are fixedly secured to the plate 156. The fixed contacts 87, 98, 82 and 128 are adjustably secured to a support 166 and are contacted by the movable contacts 92, 110, 86 and 134 respectively when the governor 19 is operating, the spacing between the contacts being such that the switch 130 closes at a relatively low speed of the vehicle, say, 9 M. P. H. Switches 84, 100 and 88 may be adjusted to close at vehicle speeds of 25, 10 and 35 M. P. H. respectively, such operation being made possible by the bending of the strips 158, 160, 162 and 164 as the flexible plate 156 is moved to the left, Figure 4. A spring 153 of definite scale surrounds the pin 154 and is positioned between the plate 152 and a partition wall 155. This spring resists the leftward movement of the plate 152 under the action of the governor weights and is so constructed so cooperates with the flexible plate 156 and other parts of the switch operating mechanism as to effect the result desired, that is closing of the switches 84, 88, 100 and 130 at the different speeds of the vehicle. As disclosed in Figure 6, terminal members 176, 178, 180 and 182 are detachably mounted upon the ends of the fixed contacts 87, 98, 82 and 128 respectively, and leads 114 and 94 are connected to terminal clips 95 and 183 respectively.

Briefly describing the operation of the breaker switch and relay switch mechanisms, when the speed of the vehicle reaches 9 M. P. H. as the vehicle is getting under way, the switch 130 is closed, and when the speed reaches 10 M. P. H., the switch 100 is closed. Assuming that the switch 44 is closed as a result of a wide opening of the master engine throttle, current then flows from the battery 25, via starting motor 11, switches 15 and 24, lead 56, conductor terminal 5, lead 70, movable contact 66 and fixed contact 96 of switch 68, lead 102, switch 100 which is then closed, lead 114, terminal member 50, lead 52, switch 44, lead 53, terminal 51, lead 124, contact 116 of relay switch 108, lead 122, winding 118 of solenoid 120, lead 132 and closed switch 130, and is grounded. The solenoid 120 is then energized, closing the switch 108, thereby permitting current to flow from the terminal 54 to the terminal 55 via the lead 70, switch 68, leads 102 and 104, closed switch 108 and leads 124 and 126. It follows therefore, so long as the contacts 66 and 96 of switch 68 remain in contact with each other and the speed of the vehicle is above 9 M. P. H. or that speed necessary to close switch 130, that the passage of current to terminal 55 is independent of the manifold vacuum operated switch 44, for the switches 44 and 108 are then in parallel in the circuit interconnecting the terminal 55 and the switch 68. It may be said therefore that the switch 44 functions only to initiate an operation of the breaker and relay switch mechanisms, which operation is now being described.

Now the terminal 55 is wired to an ignition terminal 190 on the starter control unit 31, as is disclosed in Figures 1 and 11. Accordingly, when current flows to said terminal, unit 31 functions, in a manner to be described hereinafter, to effect an operation of the starting motor 30 to crank the booster engine 18. Other electrical controls for the booster engine include a back-fire switch 184, an ignition coil 186 and a distributor 188, said controls being wired in series, the back-fire switch being connected to the ignition terminal 190.

Should the speed of the vehicle be increased to 35 M. P. H. or any other speed at which the switch 88 is closed, the closing of said switch completes a circuit including the terminal 54, a portion of the lead 70, lead 94, closed switch 88, lead 90, contact 72, lead 74, solenoid winding 76, lead 80 and switch 84 and is grounded. The latter switch is at the time closed, inasmuch as the speed of the vehicle is in excess of 25 M. P. H., the speed at which said switch closes.

The completion of the electrical circuit just described effects an energization of the solenoid 78, resulting in the contact 66 being moved into contact with the contact 72, thereby cutting off the flow of current from the battery 25 to the units 31, 186 and 188. The cutting off of the circuit to the booster ignition controls results in a stopping of the booster engine, which is desirable, for the vehicle having reached a speed of, say, 35 M. P. H., the power developed by the master engine is sufficient to maintain said speed, and in all probability increase the speed of the vehicle.

Should the vehicle be slowed down, when climbing a hill, the booster engine will be cut in to aid the master engine when the speed of the vehicle is decreased to, say, 25 M. P. H. Describing this operation, it will be remembered that the solenoid 78 was energized to move the contact 66 into contact with contact 72 when the speed of the vehicle reached 35 M. P. H., and the energized solenoid maintains said contacts in engagement until the switch 84 is opened by reducing the speed of the vehicle below 25 M. P. H. The opening of the switch 84 results in a deenergization of the solenoid 78 and a return of the contact 66 into engagement with the contact 96. This return is effected by a spring 192. Now, when the contacts 66 and 96 are moved into engagement, current is immediately supplied to the booster engine control unit 31 to effect a recranking of the booster engine. Tracing this circuit through the governor operated breaker switch and the relay switch mechanisms, current flows via terminal 54, lead 70, contacts 66 an 96, leads 102 and 104, closed switch 108, leads 124 and 126, terminal 55 and lead 191. The booster engine having been started, the same remains in operation until the speed of the vehicle is reduced sufficiently to open the switch 130. When such a speed is reached, say, a speed below 9 M. P. H., the opening of the switch 130 results in a deenergization of the solenoid 120 and a consequent opening of the switch 108. The current to the unit 31 is thus broken, resulting in a stopping of the booster engine. It should also be noted that inasmuch as the switch 100 is opened below 10 M. P. H. current may not flow to the unit 31 via the switch 44. It is desirable to cut off the booster engine at a relatively low vehicle speed in order to protect the driving units of the vehicle from possible damage due to excessive torque which would be developed with both engines operating while the transmission of the vehicle is in creeping gear.

Describing now the remainder of the automatically operable mechanism for starting the booster engine, there is provided the starting motor 30 of conventional design and the control unit 31 therefor. As stated above, said unit so controls the flow of current to the motor 30 as to automatically effect a recranking of the booster engine, should the same come to an undesired stop when the above-described controls on the master engine are set for an operation of the booster engine. Briefly describing the unit 31, which is disclosed in Figure 11, it includes a casing 208 housing a main switch 210, a solenoid 212 for operating said switch, a switch 214 for controlling said solenoid, a lever 216, a cam 218 mounted on the end of said lever, a relay solenoid 219 and a lever 220 operable by the armature 222 of said solenoid.

Describing now the operation of the unit 31 and incidentally completing the description of the parts thereof, when the master engine and booster engine ignition switches 15 and 24 are closed and the manifold vacuum operated switch 44 is closed by a wide opening of the master engine throttle and the vehicle is traveling at the speed necessary to effect a cut-in operation of the breaker switch mechanism 21, current from the battery 25 flows, via the ignition switches, the switches 68 and 100, the vacuum operated switch 44 and the wiring and terminals interconnecting these parts, to the ignition terminal 190 on the starter control unit 31. After passing through the ignition terminal 190, the current follows a wire 224 leading to a winding 226 of the master switch operating solenoid 212 through the contacts of the switch 214 and to the grounded lever 216, which is pivotally mounted at 228. The passage of current magnetizes the solenoid 212, and the armature 232 of the solenoid is pulled in, against the tension of a return spring 234, thereby closing contacts 236, 238 and 240 of the main switch 210. The circuit to the starting motor 30 is now closed and the starting mechanism, such as a drive pinion, automatically meshes with the flywheel and cranks the booster engine until it starts. This circuit includes a lead 244, a terminal 246, switch 210, a so-called one-half turn series hold-out coil 248 and a lead 250.

While this phase of the starting cycle is occurring, current drawn by the starting motor 30 passes through the holdout coil 248, which magnetizes the outer end of the armature 222 of the relay solenoid 219, thereby holding it while the engine is being cranked. At the same time a flow of current is entering a winding 252 on the relay solenoid through a wire 254, which is connected to the hold-out coil 248. The current through this wire only flows when the switch 210 is closed and has a tendency to draw the armature 222 of the relay solenoid to the right and open the switch 214: however, attraction from the hold-out coil holds said armature out while the engine is being cranked. The pull from the starter winding 252 is only adequate to draw the armature in, providing the current through the hold-out coil is sufficiently small, as is the case after the starter pinion demeshes and the starting motor is running under no cranking load.

When the booster engine starts, the starter pinion is automatically disengaged, and current through hold-out coil 248 and the magnetic pull resulting therefrom then decrease. Consequently, the starter winding 252 on the relay solenoid 219 overcomes the magnetic attraction of the hold-out coil, and the relay solenoid armature 222 is pulled to the right, compressing a return spring 256. This travel of the armature actuates the lever 220, which fits within a recess in the armature, and the lever, in turn, contacts the cam 218 to rotate the lever 216. The switch 214 is thus opened, breaking the circuit to the main switch 210. It is apparent therefore that the starting motor circuit is always opened immediately upon the automatic disengaging of the starter pinion and results in less current draw from the battery because of its quick action. The moment the engine fires and continues to run, current then being supplied by a generator 258 enters a terminal 260 extending from the casing 208 of the unit 31 and energizes a grounded generator winding 262 on the relay solenoid 219. This energization is of sufficient strength to hold the armature 222 to the right against the tension of the return spring 256. The nature of the generator winding is preferably such that only a very small voltage, which is available immediately upon starting or during idling of the engine, is necessary to effect this result. The starter and generator windings 252 and 262 of the relay solenoid 219 are so arranged that they assist one another, and because of this the generator winding has some effect in aiding the starter winding to overcome the effect of the hold-out coil 248.

As along as the engine is running and current is being supplied by the generator, the relay solenoid armature 222 is held in its position to the right thereby, through the intermediary of the lever 220, cam 218 and lever 216, maintaining the switch 214 open. However, if the engine stops or is stalled at any time while current is being supplied to the ignition terminal 190, that is, when the controls are set to cut the booster engine into operation, the generator winding on the relay solenoid becomes inactive. Consequently, the armature 222 is released or moved to the left, Figure 11, by the action of the return spring 256. The switch 214 is then closed, resulting in an energization of the solenoid 212 and a closing of the switch 210. The booster engine is then recranked by the starting motor 30.

The parts are so constructed and arranged that just the right amount of time interval, say, one second, is automatically allowed between the stopping of the booster engine and the reclosing of the starting switch 210 so as to permit said engine to come to a complete rest before restarting occurs. The time delay is governed by the period of vibration of the lever 216, which is released upon stopping of the engine and prevents current flowing through the contacts of the switch 214, which control the solenoid 212, until the lever 216 comes to rest. This means that restarting is accomplished in a minimum of time and with complete assurance of protection to the starter system. Regardless of the number of times the booster engine stops or is stalled while the controls call for an operation of said engine, the starter control unit 31 insures an automatic restarting of the engine.

Figure 10:
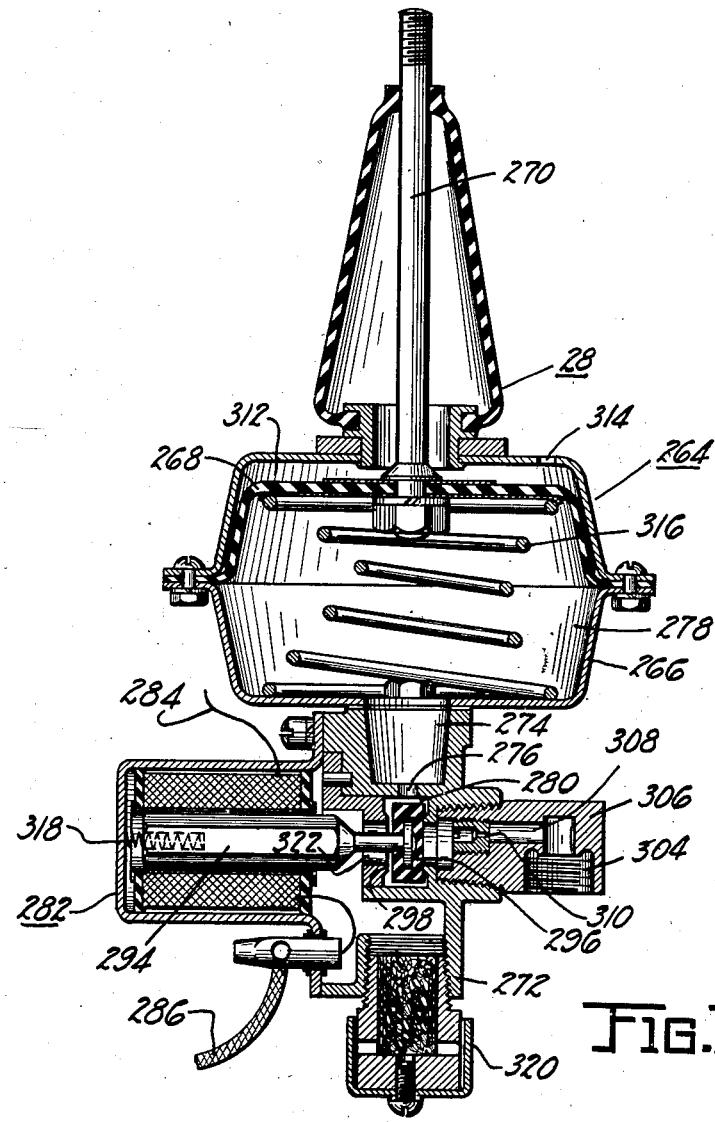
Figure 10 is a sectional view disclosing, in detail, the power mechanism for actuating the throttle of the booster engine.

At substantially the same time that current is supplied to the starter control unit 31 to crank the booster engine, current is also supplied to the power means 28 for slowly opening the throttle 29, which controls the speed of said engine. Describing this power means, which is disclosed in Figure 10, there is provided a vacuum operated motor 264 including a casing 266 and a movable diaphragm or power element 268, the latter being connected by a rod 270 to the throttle. A valve and valve operating mechanism are mounted on the casing 266, said parts consisting of a housing 272 recessed at 274 and provided with a duct 276 interconnecting a chamber 278 of the motor 264 and a chamber 280 in the housing. A solenoid 282 is secured to the housing and is electrically connected to the field coil of the booster engine starter motor 30 and to a fixed contact 288 of the accelerator operated breaker switch 26, disclosed in detail in Figure 12, by leads 284 and 286 respectively. As is disclosed in Figure 1, one of the contacts of the switch 26 is wired to the terminal 55. Both the switch 26 and the solenoid 282 are wired to the terminal 55 and to the starting motor 30, said switch and solenoid being included in circuits which are in parallel with each other.

Describing the operation of this throttle operating mechanism 28 and incidentally completing the description of the parts thereof, when the accelerator 14 of the vehicle is depressed to open the throttle 13 controlling the master engine, the accelerator operated switch 26 is closed, a movable contact 290 connected to the accelerator by a link 292 being moved into engagement with the fixed contact 288. With the vehicle traveling, say, between 9 and 35 M. P. H. and the accelerator 14 depressed, an electrical circuit is completed to energize the solenoid 282. This circuit includes the grounded battery 25, ignition switches 15 and 24, switches 68 and 108 of the breaker switch mechanism 21, accelerator operated switch 26, the solenoid 282 and the grounded field coil of the starting motor 30. If the starting motor 30 is at that time operating to crank the booster engine, there is no potential difference across the solenoid 282; hence it is not energized. As soon as the starting motor 30 and the engine starter mechanism operated thereby cease to crank the booster engine, the starter terminal becomes a ground through the starter field coil. The solenoid 282 is now energized, resulting in its armature 294 being moved to the left to seat a valve member 296 upon a land or valve seat 298. The chamber 278 of the vacuum motor 264 is then connected to a vacuum pump 300 driven by the master engine 10, said connection including a conduit 302, port 304 in a plug 306, a duct 308 in said plug, a duct 310 of small diameter, valve chamber 280, duct 276 and recess 274. Air is then withdrawn from the chamber 278 of the throttle operating motor 264, effecting a differential of pressures acting upon the diaphragm 268 of said motor; for a chamber 312 of the motor 264 is at all times in communication with the atmosphere via a port 314 in the casing 266 of the motor. The diaphragm is thus moved downwardly, against the tension of a return spring 316, to open the throttle 29. This opening movement of the throttle is relatively slow by virtue of the small opening or duct 310, which effects a withdrawal of air from the chamber 278 at a relatively slow rate. The rate of flow of air from the chamber 278 determines the rate of movement of the diaphragm 268 and the throttle connected thereto.

The opening of the throttle 29 is thus delayed until the starter control unit 31, the starting motor 30 and other control mechanisms have functioned to start the booster engine.

When the electrical circuit to the solenoid 282 is broken, for example, when the accelerator 14 is released to open the switch 26 or when the speed of the vehicle is reduced to open the switch 108, then said solenoid is deenergized. A spring 318 then acts to move the armature 294 and the valve member 296 connected thereto to the right to seat said member, as disclosed in Figure 10, and to admit air at atmospheric pressure into the chamber 278 via an air cleaner 320, an opening 322 in the housing 272, chamber 280, duct 276 and recess 274. The spring 316 then functions to quickly close the throttle 29 to its engine idle position.

There is thus provided a booster engine control mechanism, automatic in operation, to crank said engine and to slowly open the throttle, when the aid of the engine is needed, that is, when the master engine, operating at full throttle, is unable to maintain a desired vehicle speed.

To start the booster engine and open its throttle the driver has no additional controls to operate, it being merely necessary for him to depress the accelerator sufficiently to open wide the throttle controlling the master engine. With the throttle so opened and the speed of the vehicle within a certain range to determine the setting of the switches of the breaker and relay switch mechanisms, the booster engine is automatically cut into operation. Furthermore, the booster engine is automatically cut out of operation when the speed of the vehicle exceeds a predetermined maximum or reaches a predetermined minimum, and should the driver release the accelerator before the booster engine is cut out of operation, the throttle of said engine is automatically closed to its engine idle position.

While one illustrative embodiment has been described, it is not my invention to limit the scope of the invention to that particular embodiment, or otherwise than by the terms of the appended claims.

I claim:

1. In an automotive vehicle provided with a power plant including a master engine, a booster engine and separate ignition systems for in part controlling the operation of said engines, a booster engine electrically interconnected control mechanism comprising, in combination, a governor operated breaker switch mechanism operative in accordance with the speed of the vehicle, a manifold vacuum operated switch, an accelerator operated switch, a starting motor, an electrically operated and controlled starter control unit and a power operated and electrically controlled throttle operating mechanism operative, after the booster engine has been started, to open the booster engine throttle, said mechanisms, motor, control unit and switches being so constructed and so electrically interconnected as to render the starter control unit operative to initiate an operation of said booster engine when the manifold vacuum operated switch is closed, the accelerator is depressed to a certain position and the vehicle is traveling at a certain speed and so constructed and electrically interconnected as to insure a continuous operation of the booster engine when the vehicle is traveling between certain speed limits until the speed of the vehicle reaches the upper of said limits and also to insure a continuous operation of the booster engine when the vehicle is traveling between other speed limits until the speed of the vehicle reaches the lower of said limits.

2. In an automotive vehicle provided with a power plant including a master engine, a booster engine and separate ignition systems for in part controlling the operation of said engines, a booster engine control mechanism comprising, in combination, a governor operated breaker switch mechanism operative in accordance with the speed of the vehicle, a manifold vacuum operated switch, a starting motor, an electrically operated and controlled starter control unit, and further comprising a power operated and electrically controlled throttle operating mechanism and an accelerator operated switch for in part controlling the operation of said throttle operating mechanism, said booster engine control mechanism being electrically interconnected and operative to initiate an operation of said booster engine when the accelerator is depressed to a certain position, the gaseous pressure within the intake manifold of the master engine reaches a predetermined value and the governor operated breaker switch mechanism is rendered operative by increasing the speed of the vehicle to a certain factor.

3. A booster engine control mechanism comprising, in combination, a breaker switch mechanism, a governor for operating said mechanism, a breaker switch wired to said breaker switch mechanism, a pressure differential operated motor for operating said breaker switch, a starter control unit wired to said breaker switch, an accelerator operated switch, a power operated and controlled throttle operating mechanism including a solenoid wired to said latter switch, and means for making possible an operation of said control mechanism including an ignition switch.

4. A booster engine control mechanism comprising, in combination, a breaker switch mechanism having a plurality of successively operated switches, a governor for operating said switch mechanism, a breaker switch wired to said breaker switch mechanism, an intake manifold vacuum operated motor for operating said breaker switch, a starting motor, a starter motor control unit wired to said breaker switch, an accelerator operated switch, a power operated and controlled mechanism including a solenoid wired to said latter switch, and means for making possible an operation of said control mechanism including an ignition switch.

5. In an automotive vehicle provided with a power plant having a master engine, a booster engine and a throttle for in part controlling the operation of said booster engine, booster engine control mechanism including a breaker switch mechanism comprising a plurality of power operated switches, power means for operating said switches including a governor mechanism operative in accordance with the speed of the vehicle, a breaker switch wired to said breaker switch mechanism, an intake manifold vacuum operated motor for opening said breaker switch when the gaseous pressure within the intake manifold of said master engine is decreased to a predetermined factor and for closing said breaker switch when the gaseous pressure within the intake manifold of said master engine is increased to a predetermined factor, and means, rendered operative by the closing of said breaker switch and a certain switch closing operation of said breaker switch mechanism, for cranking said booster engine and opening the aforementioned throttle, said means including a pressure differential operated motor operatively connected to said throttle, and further including a starting motor and a starter control unit for in part controlling the operation of said starting motor.

6. Booster engine control mechanism for controlling the booster engine constituting a part of the power plant of a heavy-duty automotive vehicle, said plant including a throttle and an ignition system comprising an ignition switch, said control mechanism including, in combination, an engine starter control unit, power means for operating the throttle including a control valve, a solenoid for operating said valve, and means for controlling the operation of said control unit and solenoid including a breaker switch mechanism operative in accordance with the speed of the vehicle.

7. Booster engine control mechanism for controlling the booster engine constituting a part of the power plant of a heavy-duty automotive vehicle, said plant including a booster engine throttle and an ignition system comprising an ignition switch, said control mechanism including, in combination, an engine starter control unit operable to automatically restart the starting motor in the event the same is stopped when the ignition switch is closed, power means for operating the throttle including a motor and a control valve for said motor, a solenoid for operating said valve, and means for controlling the operation of said control unit and solenoid including a breaker switch mechanism operative in accordance with the speed of the vehicle, and further including a breaker switch and power means for closing said breaker switch.

8. In an automotive vehicle provided with a master engine, an accelerator for in part controlling the vacuum in the intake manifold of said engine, a booster engine and a throttle for in part controlling the operation of said booster engine, control mechanism for said booster engine including an electrically operated and controlled starter control unit, power means for operating said booster engine throttle including a motor and a control valve therefor, power means for operating said valve including a solenoid, and means for controlling the operation of said solenoid and starter control unit including a breaker switch, an intake manifold vacuum operated motor for opening said switch and a governor operated breaker switch mechanism, said latter mechanism being operative, after the breaker switch has cooperated with the governor operated breaker switch meachanism to initiate the sending of electrical current to the starter control unit and solenoid, to continue to send current to the control unit until the vehicle speed reaches a predetermined factor, whereupon the current to the control unit is cut off.

9. In an automotive vehicle provided with a power plant including two internal-combustion engines, means, including a starting motor and a throttle, for cranking one of said engines and controlling the speed thereof, and automatically operable means for operating and controlling the operation of said aforementioned means including a starter control unit for in part controlling the operation of said starting motor, a motor operably connected to the throttle, a valve for controlling the operation of said motor, power means for actuating said valve, means for controlling the operation of said power means and starter control unit including a plurality of switches, and further including means operable when the vehicle is traveling at certain speeds to so actuate said switches as to make possible an operation of said starter control unit and throttle operating power means.

10. A power operated breaker switch mechanism for controlling a part of the power plant of an automotive vehicle, said mechanism comprising a plurality of terminals including an inlet terminal and an outlet terminal, four switches, means for operating said switches including a governor operative in accordance with the speed of the vehicle, two hold-down relay switches, a solenoid for operating each of said relay switches, and wiring interconnecting the windings of said solenoids, the terminals and the contacts of said switches, said parts being so constructed and arranged and the wiring being such as to make possible a flow of current to the outlet terminal of the switch mechanism when but only when the vehicle is traveling between certain speed limits and until the speed of the vehicle reaches a predetermined factor, and furthermore to thereafter again make possible a flow of current to the outlet terminal when the speed of the vehicle is reduced to a predetermined factor, said current flow being then continued until the speed of the vehicle is further reduced to a predetermined factor.

11. In an automotive vehicle having a power plant including an accelerator, means for controlling the operation of said power plant to effect an increase in the power output of said plant when the accelerator is substantially fully depressed and to automatically effect a change in the driving ability of said plant at a certain critical speed of the vehicle, said means including a vehicle speed responsive governor and further including a pressure differential and spring operated motor and an accelerator operated switch constituting a part of the means for controlling the operation of said motor.

12. In an automotive vehicle having a power plant including an accelerator, means for controlling the operation of said power plant to effect an increase in the speed of the vehicle when the accelerator is substantially fully depressed said means including a pressure differential and spring operated motor and an accelerator operated switch constituting a part of means for controlling the operation of said motor.

13. In an automotive vehicle having a power plant including an internal combustion engine, an accelerator for in part controlling the operation of said engine and means, cooperating with said engine, and in part controlled by an operation of the accelerator, for either increasing or decreasing the power output of said plant to thereby control the speed of the vehicle said means including control means, comprising a vehicle speed responsive governor and an accelerator operated switch, and said means being operative, to increase the power output of the power plant to increase the speed of the vehicle, when the accelerator is fully or substantially fully depressed.

EARL R. PRICE.